Feb. 18, 1958     H. GRAY     2,823,956
EMERGENCY WHEEL
Filed Sept. 27, 1956     2 Sheets-Sheet 1
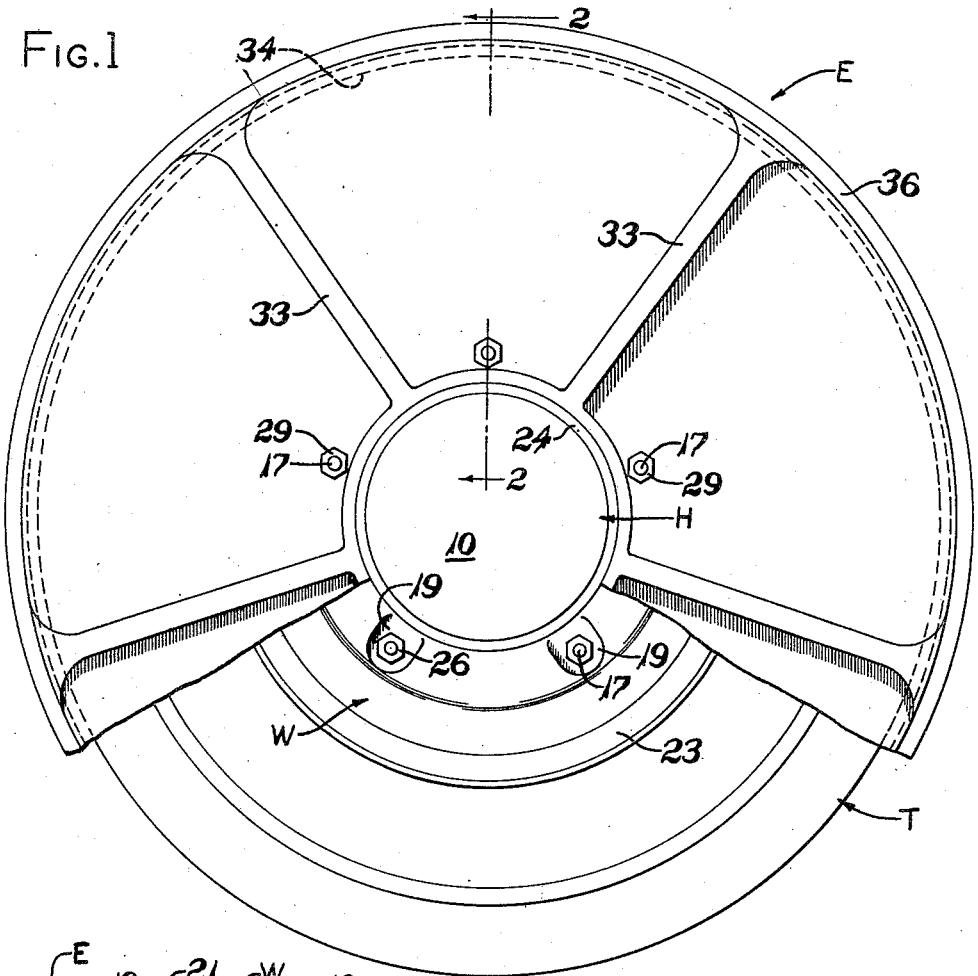
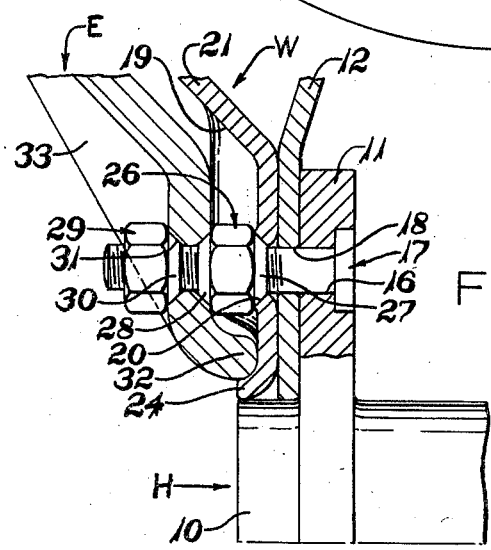
INVENTOR.
HAROLD GRAY
BY C. E. Tripp
ATTY.

Feb. 18, 1958 H. GRAY 2,823,956
EMERGENCY WHEEL
Filed Sept. 27, 1956 2 Sheets-Sheet 2
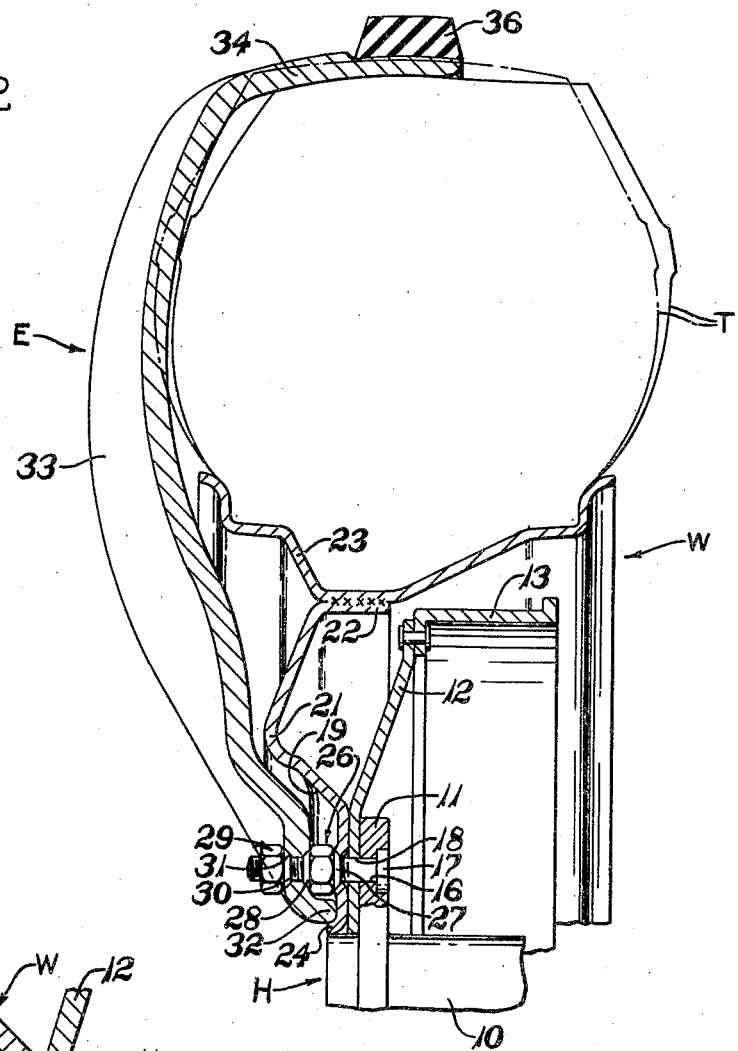
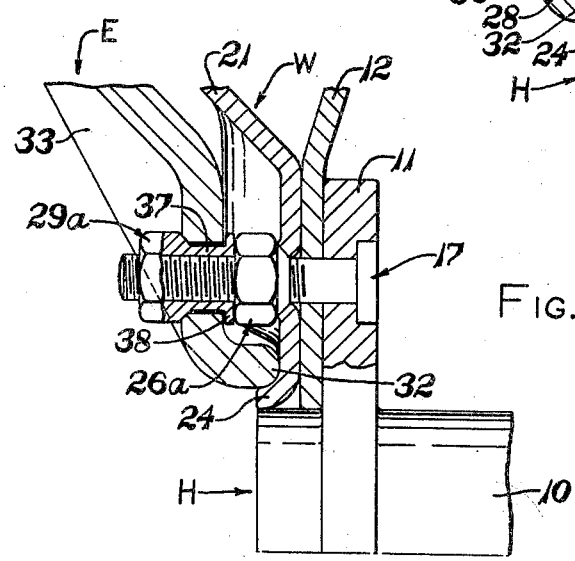
INVENTOR.
HAROLD GRAY
BY C. E. Tripp
ATTY.

United States Patent Office 2,823,956
Patented Feb. 18, 1958

2,823,956
EMERGENCY WHEEL

Harold Gray, Akron, Ohio, assignor to The B. F. Goodrich Company, New York, N. Y., a corporation of New York Application September 27, 1956, Serial No. 612,547

4 Claims. (Cl. 301—38)

This invention is for an emergency wheel to be carried by vehicles equipped with pneumatic tires, most particularly passenger car vehicles. The wheel is intended to serve as a means for reaching a service station or the like in case one of the pneumatic road tires is punctured, blown out, or otherwise damaged enough to cause deflation of the tire. The wheel of this invention is only about half as great in axial dimension as is the common inflated spare tire and wheel assembly carried in the vehicle and the wheel of this invention is intended to make it unnecessary to find space in the vehicle for an inflated spare tire and wheel assembly.

The emergency wheel of this invention is mounted on the same bolts used to mount the main road wheel, it being contemplated that with vehicles to be equipped with the wheel of this invention the main wheel mounting bolts are made slightly longer than usual in order to accommodate the emergency wheel, and a separate set of mounting nuts for the emergency wheel is employed. In addition to being supported by the main wheel bolts and emergency mounting nuts the emergency wheel has a generally axially inwardly directed lip arranged to fit on a generally outwardly directed lip formed on the main road wheel, thus providing additional strength and support during emergency use of the wheel. The periphery of the emergency wheel is axially extended to snugly embrace the deflated road tire and has a rubber cushion tread that is disposed at the mid-plane of the deflated tire. The following detailed description of a preferred embodiment of the invention will serve to illustrate how one skilled in the art may practice the invention.

In the drawings, Fig. 1 is a side view of a road wheel and emergency wheel assembly with the emergency wheel partially broken away. Fig. 2 is a section taken on 2—2 of Fig. 1. Fig. 3 is an enlarged fragmentary section taken through a mounting bolt. Fig. 4 is a similar section of a modified form of the invention.

As best seen in Fig. 2 the assembly of the invention includes the hub H, road wheel W, tire T, and emergency wheel E. Hub H has the conventional cylindrical body portion 10 for receiving the axle and bearings and includes a radial mounting flange 11. Extending from flange 11 is the radial flange 12 of the drum to which the brake drum 13 is riveted by rivets, these details forming no part of the invention. Hub flange 11 is apertured as 16 to receive a circular row of wheel mounting bolts 17 in the usual manner, which bolts also extend through apertures 18 formed in the brake drum flange 12. The road wheel W has a mounting flange which is dished in as at 19, such dished in areas each having an aperture to receive bolts 17. The metal at the apertures is bent outwardly to provide conical recesses 20. The wheel has an outwardly dished nave portion 21 which leads to a cylindrical flange portion 22 welded to the drop center rim 23, it being understood that the road wheel construction is a conventional one.

There is an axially outwardly directed lip 24 formed on the road wheel disc that bounds the center aperture in the wheel and telescopically fits over the body 10 of the hub. The main wheel mounting nuts 26 have inner conical nose or face portions 27 that engage the conical recesses 20 at the apertures in the road wheel and nuts 26 also have outer conical faces 28 formed for engaging complementary conical recesses formed in the emergency wheel E.

The emergency wheel E is mounted on the bolts 17 by emergency nuts 29 having conical faces 30 that fit axially outwardly facing conical recesses 31 formed in the mounting flange of the emergency wheel. The emergency wheel has a generally axially inwardly directed lip 32 that telescopes over the lip 24 on the main road wheel for additional radial support.

The emergency wheel is ribbed as at 33 for strength and has a peripheral circumferential flange 34 that snugly surrounds the deflated tire T and carries a rubber cushion tread 36 centered at about the mid-plane of the road wheel and tire assembly. An ornamental hub cap is conventionally provided on road wheels but is removed when the emergency wheel is required.

In the form of the invention shown in Figs. 2 and 3 the emergency nuts 29 can be kept on the bolts 17 until their use is required. In the form of the invention shown in Fig. 4, the main wheel nuts 26a are conventional, that is they do not have the double conical face construction. Emergency nuts 29a are rotatably mounted on the emergency wheel by means of a sleeve portion 37 and a flanged or headed portion 38 integral with the body of the emergency nuts. This construction has the advantage that the nuts are always ready for use and there is no danger of their being lost. The emergency wheel lip 32 telescopes over main wheel lip 24 to give additional radial support just as in the embodiment of the invention previously described.

Having completed a detailed description of an embodiment of the invention so that those skilled in the art may practice the same, I claim:

1. An emergency wheel and road wheel and tire assembly comprising a hub, bolts extending through said hub, a road wheel having a central aperture to receive said hub and a circular row of apertures for receiving said bolts, road wheel nuts threaded on said bolts and clamping said road wheel to said hub, said road wheel having an axially outwardly extending lip bounding said central aperture, a one piece emergency wheel having a central aperture and a circular row of apertures aligned with said bolts, said emergency wheel having a generally axially inwardly directed lip bounding the central aperture and seated on said main wheel lip, and set of emergency nuts rotatably fixed in said circular row of emergency wheel apertures and threaded directly on said bolts and clampingly pressing said emergency wheel against said road wheel nuts, said road wheel nuts having polygonal wrench receiving surfaces and said nuts being entirely disposed between the road and emergency wheels.

2. An emergency wheel for use with a road wheel and tire assembly comprising a hub, bolts extending through said hub, a road wheel having a central aperture at said hub and a circular row of apertures for receiving said bolts, road wheel nuts threaded on said bolts and clamping said road wheel to said hub, said road wheel having an axially outwardly extending lip bounding said central aperture; an emergency wheel having a central aperture and a circular row of apertures aligned with said bolts, said emergency wheel having a generally axially inwardly directed lip bounding the central aperture formed for seating on said main wheel lip, and a set of emergency nuts for threaded mounting directly on said bolts to clampingly mount said emergency wheel on the bolts, said road wheel nuts having polygonal wrench receiving surfaces and said nuts being entirely disposed between the road and emergency wheels.

3. An emergency wheel and road wheel and tire assembly comprising a hub, bolts extending through said hub, a road wheel having apertures with conical outer faces centered on said bolts, said wheel being axially inwardly dished at said apertures to provide nut receiving pockets, road wheel nuts with axially opposed conical faces threaded on said bolts and clamping said road wheel to said hub, a one piece emergency wheel having apertures aligned with said bolts, axially opposed conical recesses formed at said apertures with the axially inner recesses fitting against the axially outer conical faces of said road wheel nuts, said emergency wheel engaging said road wheel between said pockets, and a set of emergency nuts having axially inner conical faces and threaded directly on said bolts and clampingly pressing against the axially outer of said conical recesses formed on said emergency wheel, to press said emergency wheel against said road wheel and the outer conical faces of said road wheel nuts, said road wheel nuts having polygonal wrench receiving surfaces and said nuts being entirely disposed between the road and emergency wheels.

4. An emergency wheel and road wheel and tire assembly comprising a hub, bolts extending through said hub, a road wheel having a central aperture at said hub and a circular row of apertures for receiving said bolts, said road wheel being axially inwardly dished at said apertures to provide nut receiving pockets, road wheel nuts threaded on said bolts and disposed in said recesses to clamp said road wheel to said hub, said road wheel having an axially outwardly extending lip bounding said central aperture, a one piece emergency wheel having a central aperture and a circular row of apertures aligned with said bolts, said emergency wheel having a generally axially inwardly directed lip bounding the central aperture and seated on said road wheel lip, said emergency wheel engaging said road wheel between said pockets, and a set of emergency nuts threaded directly on said bolts and clampingly pressing said emergency wheel against said road wheel, said road wheel nuts having polygonal wrench receiving surfaces and said nuts being entirely disposed between the road and emergency wheels.

References Cited in the file of this patent

UNITED STATES PATENTS

| | | |
|---|---|---|
| 1,629,903 | Benedict et al. | May 24, 1927 |
| 1,843,985 | Nelson | Feb. 9, 1932 |
| 2,203,774 | Cornelissen | June 11, 1940 |
| 2,217,646 | Eksergian | Oct. 8, 1940 |
| 2,566,007 | Weaver | Aug. 28, 1951 |